(12) United States Patent
Mitsutani et al.

(10) Patent No.: US 6,875,154 B2
(45) Date of Patent: Apr. 5, 2005

(54) CONTROL SYSTEM AND METHOD FOR MOTOR VEHICLES

(75) Inventors: Noritake Mitsutani, Toyota (JP); Tomoyuki Uchiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 10/606,996

(22) Filed: Jun. 27, 2003

(65) Prior Publication Data

US 2004/0084002 A1 May 6, 2004

(30) Foreign Application Priority Data

Jul. 19, 2002 (JP) .................................... 2002-211031

(51) Int. Cl.$^7$ .............................................. F02N 17/00
(52) U.S. Cl. .................................... 477/107; 123/179.4
(58) Field of Search ..................... 477/107; 123/339.18, 123/339.22, 339.16, 179.4, 406.24, 179.2, 179.3

(56) References Cited

U.S. PATENT DOCUMENTS

| | | | |
|---|---|---|---|
| 5,775,299 A | 7/1998 | Ito et al. | |
| 5,818,116 A | 10/1998 | Nakae et al. | |
| 6,018,198 A | 1/2000 | Tsuzuki et al. | |
| 6,082,330 A | 7/2000 | Alberter et al. | |
| 6,087,734 A | 7/2000 | Maeda et al. | |
| 6,532,926 B1 * | 3/2003 | Kuroda et al. | 123/179.4 |
| 6,742,501 B2 * | 6/2004 | Hirano | 123/406.24 |
| 2002/0189587 A1 | 12/2002 | Hirano | |

FOREIGN PATENT DOCUMENTS

| | | |
|---|---|---|
| DE | 44 12 438 C1 | 4/1994 |
| EP | 0 810 362 A2 | 3/1997 |
| JP | 6-17727 A | 1/1994 |
| JP | 10-212983 A | 8/1998 |
| JP | 2000-297668 A | 10/2000 |

OTHER PUBLICATIONS

EPO Communication dated Nov. 22, 2004 with English language translation.

* cited by examiner

Primary Examiner—Dirk Wright
(74) Attorney, Agent, or Firm—Kenyon & Kenyon

(57) ABSTRACT

The electronic control unit sets an initial value of an inertia torque equivalent flow rate Qmg as an air flow equivalent to an inertia torque that acts on rotational elements related to a crankshaft 26, and a diminishing rate thereof, based on a shift position SP and coolant temperature Tw after the engine is cranked by a motor generator and the engine speed reaches an idle speed. The electronic control unit controls an the engine speed using an idle speed maintaining flow rate Qisc which is obtained by subtracting the inertia torque equivalent flow rate Qmg from a target idle speed maintaining flow rate Qisc*.

25 Claims, 9 Drawing Sheets

CONTROL SYSTEM AND METHOD FOR MOTOR VEHICLES

INCORPORATION BY REFERENCE

The disclosure of Japanese Patent Application No. 2002-211031 filed on Jul. 19, 2002, including the specification, drawings and abstract is incorporated herein by reference in its entirety.

BACKGROUND OF THE INVENTION

1. Field of Invention

The invention relates to a control system and method for a motor vehicle. More particularly, the invention relates to a control system and method for a motor vehicle including an internal combustion engine and a motor connected to an output shaft of the internal combustion engine.

2. Description of Related Art

Of such control systems, for example, Japanese Laid-opened Patent Publication No. 2000-297668 discloses a control system which controls engine speed using a motor generator during engine start while prohibiting idle speed control of an internal combustion engine, thus preventing interference between the idle speed control and the engine speed control with the motor generator.

With this control system, however, although interference between the idle speed control and the engine speed control does not occur when controlling the rotation speed of the output shaft of the internal combustion engine, abrupt changes in torque (i.e., torque shocks) may occur at the output shaft during an engine start. Namely, the internal combustion engine acts as load on the output shaft when cranked by the motor generator. After the engine has started, however, the engine starts serving as a driving power source outputting torque to the output shaft. Thus, it is likely that torque shocks occur at the output shaft during an engine start.

SUMMARY OF THE INVENTION

In view of the above situation, it is one object of the invention to provide a control system and method for motor vehicles that reduce or hopefully eliminate torque shocks which may occur during an engine start. To achieve this object, the control system and method according to the invention incorporate the following constructions and procedures.

A first aspect of the invention related to a control system which is applied to a motor vehicle including an internal combustion engine and a motor connected to an output shaft of the internal combustion engine, and which is operable to perform a start control for starting the internal combustion engine. When the internal combustion engine is cranked by the motor and the speed of the internal combustion engine reaches a predetermined speed, the control system stops the cranking by the motor and estimates an inertia value indicative of inertia that acts on a rotational element related to the output shaft after the stop of the cranking by the motor. Then, the internal combustion engine is controlled based on the estimated inertia value so as to run at an idle speed.

With this arrangement, torque shocks can be reduced as compared to when the internal combustion engine is controlled to start and run at the idle speed without considering the inertia value.

In the control system aforementioned, it is preferable that the inertia value be an inertia torque value indicative of the inertia torque that acts on the rotational element, as a value corresponding to an idle control amount used for controlling the internal combustion engine to run at the idle speed. In this case, it is possible to control the internal combustion engine using a control amount obtained by subtracting the inertia torque value from a target idle control amount after the stop of the cranking by the motor. Thus, a more appropriate control amount is used for controlling the internal combustion engine to start and run at the idle speed.

Also, it is preferable that the inertia value be estimated based on the temperature of the internal combustion engine. Thus, the inertia value is made more appropriate based on the temperature of the internal combustion engine, which results in further reduced torque shocks during an engine start. In this case, the "temperature of the internal combustion engine" may be temperature that reflects or indirectly indicates the temperature of the internal combustion engine, such as the temperature of coolant for cooling the internal combustion engine, as well as temperature that directly indicates it. Also, it is preferable that the inertia value be estimated such that the inertia value becomes smaller as the temperature of the internal combustion engine becomes higher.

Also, it is preferable that the motor vehicle be provided with an automatic transmission to be shifted between at least a neutral position and a drive position, which transmits power output from the output shaft to the side of a vehicle axle while automatically changing the speed of rotation, and that the inertia value be estimated based on the shift position of the automatic transmission. With this arrangement, torque shocks can be reduced during an engine start irrespective of the shift position.

In the above case, the inertia value may be estimated based on an initial value of the inertia value and a diminishing rate, both corresponding to the shift position. Here, it is preferable that the initial value, when the shift position is the neutral position, become smaller than when the shift position is the drive position, and that the diminishing rate, when the shift position is the neutral position, become larger than when the shift position is the drive position.

Also, in the control system mentioned above, it is preferable that learning of control amounts related to an idling operation of the internal combustion engine be prohibited when the inertia value is estimated to be equal to or larger than a first reference value. Thus, when the idling operation of the internal combustion engine is controlled using the inertia value, learning of the control amounts is avoided.

Also, it is preferable that driving of a given auxiliary be stopped when the inertia value is estimated to be equal to or larger than a second reference value. By doing so, external disturbances, which may affect the control of the engine speed, can be reduced, whereby the control reliability improves.

Also, it is preferable that a feedback control be performed such that the internal combustion engine runs at the idle speed. Thus, further speed and stability can be achieved in controlling the internal combustion engine to run at the idle speed right after the engine start.

Also, it is preferable that the predetermined speed be substantially equal to the idle speed. Thus, the internal combustion engine can be controlled to start and run at the idle speed more smoothly while reducing torque shocks that may occur during an engine start.

Also, it is preferable that the start control be performed when a predetermined starting condition is fulfilled after a predetermined stopping condition has been fulfilled and the internal combustion engine has been automatically stopped. Thus, torque shocks can be further reduced during an engine start.

Next, a second aspect of the invention relates to a control system which is applied to a motor vehicle including an internal combustion engine and a motor connected to an output shaft of the internal combustion engine, and which is operable to perform an automatic start/stop control of the internal combustion engine. The control system, during an automatic start of the internal combustion engine, controls the running of the internal combustion engine at an idle speed, using a different control amount from that used when a start of the internal combustion engine is triggered by an operation of an operator.

With this arrangement, by using a different control amount from that used when a start of the internal combustion engine is triggered by an operation of an operator, control amounts can be made more suitable for the kinetic state of rotational elements related to the output shaft of the internal combustion engine, so that the internal combustion engine starts and runs at the idle speed while reducing torque shocks more quickly.

Next, a third aspect of the invention relates to a control system which is applied to a motor vehicle including an internal combustion engine and a motor connected to an output shaft of the internal combustion engine, and which is operable to perform an automatic start/stop control of the internal combustion engine. The control system controls the internal combustion engine so as to run at an idle speed, using a first control amount until a predetermined time passes after the internal combustion engine has started, and using a second control amount that is different from the first control amount, after the predetermined time has passed.

With this arrangement, control amounts that are suitable for the state of the internal combustion engine and the kinetic state of the rotational elements related to the output shaft are used until the predetermined time passes, whereby the internal combustion engine starts and runs at the idle speed while reducing torque shocks more promptly.

In the control system according to the third aspect of the invention, it is preferable that the first control amount be smaller than the second control amount. Thus, a more suitable control amount is used until the predetermined time passes. Also, the first control amount may be a value obtained by subtracting a value equivalent to inertia that acts on a rotational element related to the output shaft from the second control amount.

Next, a control system according to a fourth aspect of the invention is applied to a motor vehicle including an internal combustion engine and a motor connected to an output shaft of the internal combustion engine, and is operable to perform a transition control for controlling a transition from a state where power is output to the output shaft from the motor to a state where the internal combustion engine idles with the motor outputting no power to the output shaft. When the speed of the internal combustion engine reaches a predetermined speed, the control system stops the motor and estimates an inertia value indicative of inertia that acts on a rotational element related to the output shaft after the stop of the motor. Then, the internal combustion engine is controlled so as to run at an idle speed based on the estimated inertia value.

With this arrangement, it is possible to reduce torque shocks, which may occur during the transition control, as compared to when the transition control is performed without using the inertia value.

In the control system according to the fourth aspect of the invention, it is preferable that the transition control be performed at the time of starting the internal combustion engine.

Also, it is preferable that the motor be capable of generating electric power, and that the transition control be performed at the time of stopping the motor when the motor is generating electric power using driving power from the output shaft. Thus, it is possible to reduce torque shocks, which may occur during the power generation by the motor.

In the control systems according to the first to fourth aspects of the invention, the motor vehicle may be a hybrid vehicle that is able to run using driving power output from the motor to the output shaft.

A fifth aspect of the invention relates to a method for controlling a start of an internal combustion engine of a motor vehicle including a motor connected to the output of the internal combustion engine. In this method, when the internal combustion engine is cranked by the motor and the speed of the internal combustion engine reaches a predetermined speed, the cranking by the motor is stopped, and an inertia value indicative of inertia that acts on a rotational element related to the output shaft after the stop of the cranking by the motor is estimated. Then, the internal combustion engine is controlled based on the estimated inertia value so as to run at an idle speed.

A sixth aspect of the invention relates to a method for controlling an automatic start of an internal combustion engine of a motor vehicle including a motor connected to the output of the internal combustion engine. In this method, the internal combustion engine, during an automatic start thereof, is controlled so as to run at an idle speed, using a different control amount from that used when a start of the internal combustion engine is triggered by an operation of an operator.

A seventh aspect of the invention relates to a method for controlling an automatic start of an internal combustion engine of a motor vehicle including a motor connected to the output of the internal combustion engine. In this method, the internal combustion engine is controlled so as to run at an idle speed using a first control amount until a predetermined time passes after the internal combustion engine has been started, and using a second control amount that is different from the first control amount, after the predetermined time has passed.

An eighth aspect of the invention relates to a method for controlling a transition of a start operation state of an internal combustion engine of a motor vehicle including a motor connected to an output shaft of the internal combustion engine from a state where power is output to the output shaft from the motor to a state where the internal combustion engine idles with the motor outputting no power to the output shaft. In this method, when the speed of the internal combustion engine reaches a predetermined speed, the motor is stopped and an inertia value indicative of inertia that acts on a rotational element related to the output shaft after the stop of the motor is estimated. Then, the internal combustion engine is controlled based on the estimated inertia value so as to run at an idle speed.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF the PREFERRED EMBODIMENTS

Figure 1:
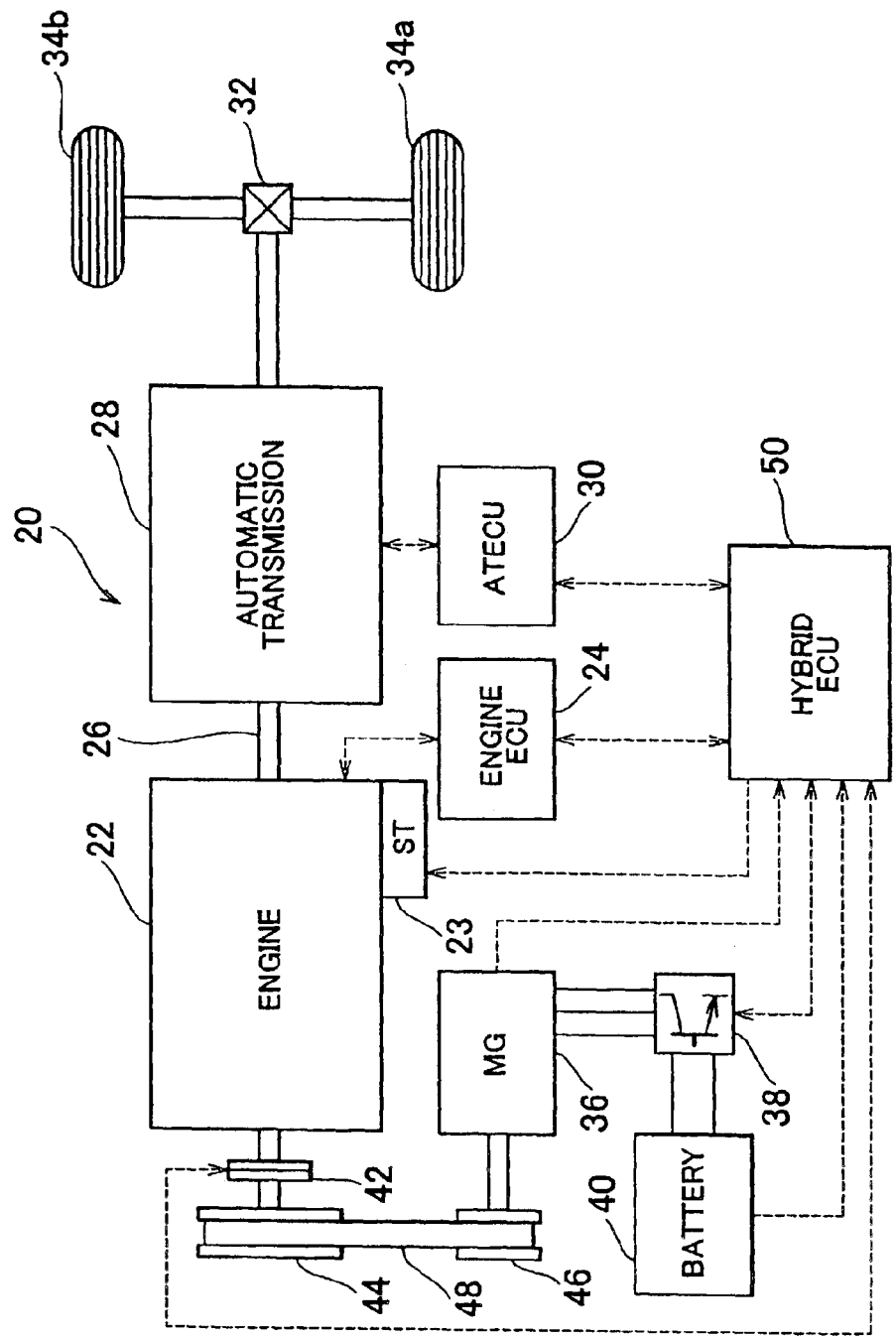
FIG. 1 is a block diagram schematically showing the configuration of a hybrid vehicle incorporating a control system according to a first embodiment of the invention.

Next, an exemplary embodiment of the invention will be described with reference to the accompanying drawings. FIG. 1 is a block diagram schematically showing the configuration of a hybrid vehicle 20 incorporating a control system according to a first embodiment of the invention. As shown in the drawing, the hybrid vehicle 20 includes an engine 22 that runs using gasoline, an engine electronic control unit (hereinafter referred to as "engine ECU") 24 for controlling the engine 22, an automatic transmission 28 that changes the rotation speed output from the engine 22 to the crankshaft 26 and transmits power from the engine 22 to driven wheels 34a and 34b via a differential gear 32 at the changed rotation speed, an automatic transmission electronic control unit (hereinafter referred to as "AT ECU") 30 which controls shifting of the automatic transmission 28, a motor generator 36 which both provides and receives driving power to and from the crankshaft 26 of the engine 22, a battery 40 which both provides and receives electric power to and from the motor generator 36 via an inverter 38, and a hybrid electronic control unit 50 which controls the starting and stopping of the engine 22, as well as the driving and the like of the motor generator 36.

Figure 2:
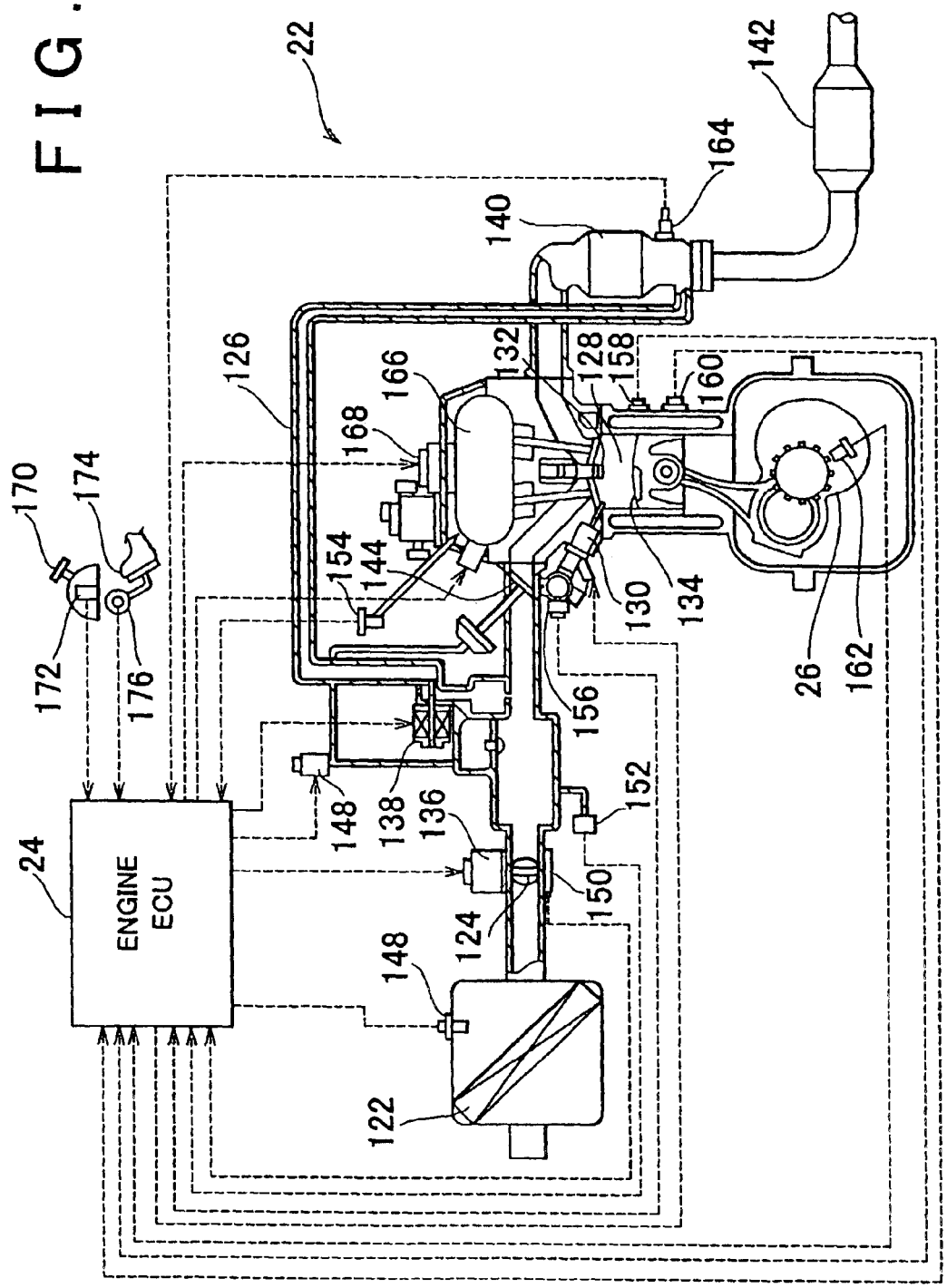
FIG. 2 is a view schematically showing the construction of an engine mounted on the hybrid vehicle shown in FIG. 1.

The engine 22 is an internal combustion engine of a direct-injection type (i.e., direct injection engine) which directly injects gasoline into combustion chambers. As shown in FIG. 2, air introduced via an air cleaner 122 and a throttle valve 124 is mixed with an exhaust gas supplied from an exhaust system through an EGR pipe 126, and is delivered into a combustion chamber 128. Then, the mixture is further mixed with gasoline injected from a fuel injection valve 130 into the combustion chamber 128, thus forming an air-fuel mixture. The air-fuel mixture is then ignited by a spark of a spark plug 132, and is thus combusted. A piston 134 reciprocates using the power generated from the combustion, thereby rotating a crankshaft 26. A throttle motor 136 is operated to open and close the throttle valve 124, and an EGR valve 138 is operated to adjust the flow rate of exhaust gas supplied from the EGR pipe 126. Also, a first purifying device 140 and second purifying device 142 are provided for purifying exhaust gas. The first purifying device 140 is adapted to remove or reduce carbon monoxide, hydrocarbons, and nitrogen oxide (NOx) that are generated while the engine 22 is running at a stoichiometric air-fuel ratio. The second purifying device 142 is adapted to store NOx which is difficult to remove at the first purifying device 140 due to the presence of oxygen in exhaust gas when the engine 22 is running at a lean air-fuel ratio, and reduce the NOx into nitrogen using carbon monoxide and hydrocarbon when the engine 22 is running at the stoichiometric air-fuel ratio. The exhaust gas, after thus purified, is released to the outside. The engine 22 includes an airflow control valve 144 and actuator 146 for driving the airflow control valve 144. In operation, the airflow control valve 144 closes one of two intake ports provided on each cylinder when the coolant temperature is low, in order to increase the flow speed of the intake air passing through the other intake port, and thus promote turbulent flows in the lateral direction in the combustion chamber 128 for stable combustion.

The engine ECU 24 controls the operation of the engine 22. The engine ECU 24 receives signals indicative of the temperature of intake air from an intake temperature sensor 148, the opening (i.e., position) of the throttle valve 124 from a throttle valve position sensor 150, the load on the engine 22 from a vacuum sensor 152, the rotational position of the camshaft, which opens and closes intake and exhaust valves for introducing air into or releasing gas from the combustion chamber 128, from a cam position sensor 154, the combustion pressure in the combustion chamber 128 from a combustion pressure sensor 156, a temperature Tw of a coolant of the engine 22 from a coolant temperature sensor 158, knocking of the engine 22 from a knock sensor 160, the rotational position of the crankshaft 26 from a crank position sensor 162, oxygen in the exhaust from an oxygen sensor 164, etc., which are all connected to the engine ECU 24. In turn, the engine ECU 24 outputs control signals to a continuously variable valve timing mechanism 166 for continuously changing drive signals to the fuel injection valves 130 and the opening/closing timing of the intake and exhaust valves, ignition coils 168 integrated with ignitors, and so on. Also, in order to output power from the engine 22 in accordance with operations by a operator, the engine ECU 24 receives signals indicative of a shift position SP of a shift lever 170 from a shift position sensor 172, and an accelerator pedal position AP of an accelerator pedal 174 from an accelerator pedal position sensor 176.

As shown in FIG. 1, the motor generator 36 is formed by, for example, a synchronous motor generator which functions as a motor as well as a generator. A belt 48 is provided between a motor-side pulley 46 mounted on the rotational shaft of the motor generator 36 and an engine side pulley 44 connected to the crankshaft 26 of the engine 22 through a clutch 42. With this arrangement, the motor generator 36 generates electric power for recharging the battery 40 using the driving power output from the engine 22 to the crankshaft 26, and the motor generator 36 in turn runs using the electric power supplied from the battery 40, thus outputting driving power to the crankshaft 26.

The hybrid electronic control unit 50 comprises a microprocessor which has a CPU as its main component. In addition to the CPU, the hybrid electronic control unit 50 is also provided with ROM for storing processing programs and data and the like, RAM for storing data temporarily, input/output ports, and a communication port, none of which are not shown in the drawing. Various signals are input to the hybrid electronic control unit 50 via the input port. Such signals include signals indicative of a motor speed from a speed sensor and motor temperature from a temperature sensor, both not shown, which are mounted on the motor generator 36; a phase current to the motor generator 36 from a current sensor, not shown, which is mounted inside the inverter 38; a battery temperature from a temperature sensor, not shown, which is mounted to the battery 40; a voltage between terminals and recharging current from a voltage sensor and a current sensor, respectively, both not shown, which are mounted near an output terminal of the battery 40. The hybrid electronic control unit 50 also outputs various signals such as a driving signal to the starter motor 23 that cranks the crankshaft 26 of the engine 22, a switching control signal to the inverter 38 for controlling the motor generator 36, and a driving signal to the clutch 42 via the output port. Further, the hybrid electronic control unit 50 is connected via the communication port to the engine ECU 24 and the AT ECU 30, and when necessary, receives data and the like regarding the state of the engine 22 from the engine ECU 24 and data and the like regarding the state of the automatic transmission 28 from the AT ECU 30, and sends control signals to the engine ECU 24 and the AT ECU 30.

With the hybrid vehicle 20 constructed as described above, an idling stop control is performed in which the engine 22 is automatically stopped when a predetermined stopping condition has been fulfilled, such as when the accelerator is OFF, i.e., the accelerator pedal 54 is not being depressed, and the brake is ON, i.e., the brake pedal is being depressed, and an engine speed Ne is equal to, or less than, a predetermined speed when the hybrid vehicle 20 is stationary with the engine 22 idling. The engine 22 is automatically started by the motor generator 36 when a predetermined starting condition has been fulfilled, such as when the accelerator is ON while the brake is OFF. Hereinafter, operation during an automatic stop of the engine 22 in the idling stop control will be described.

Figure 3A:
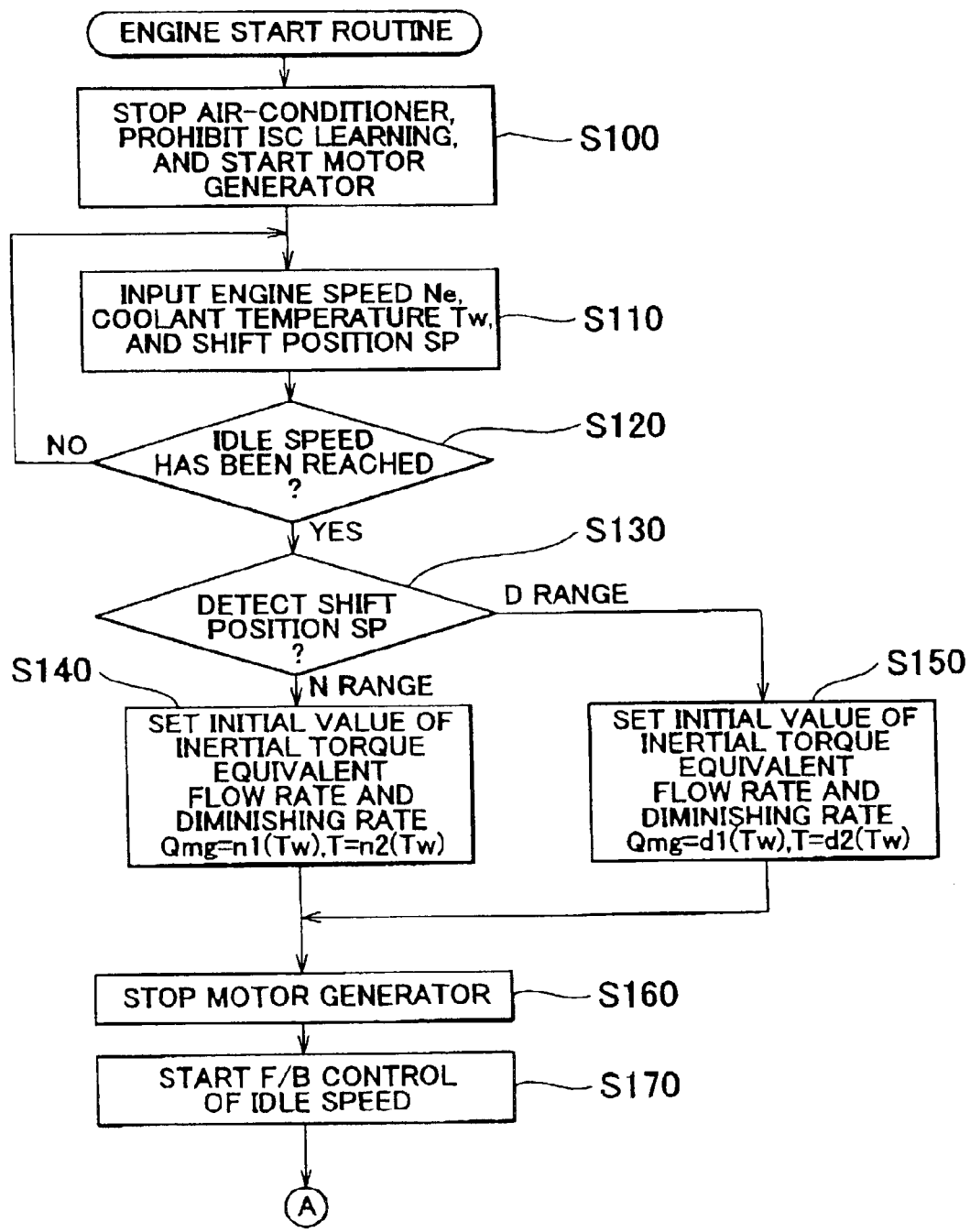
FIG. 3 is a flowchart showing one example of an engine start routine executed by the electronic control unit when a predetermined starting condition has been fulfilled during an idle stop control.
Figure 3B:
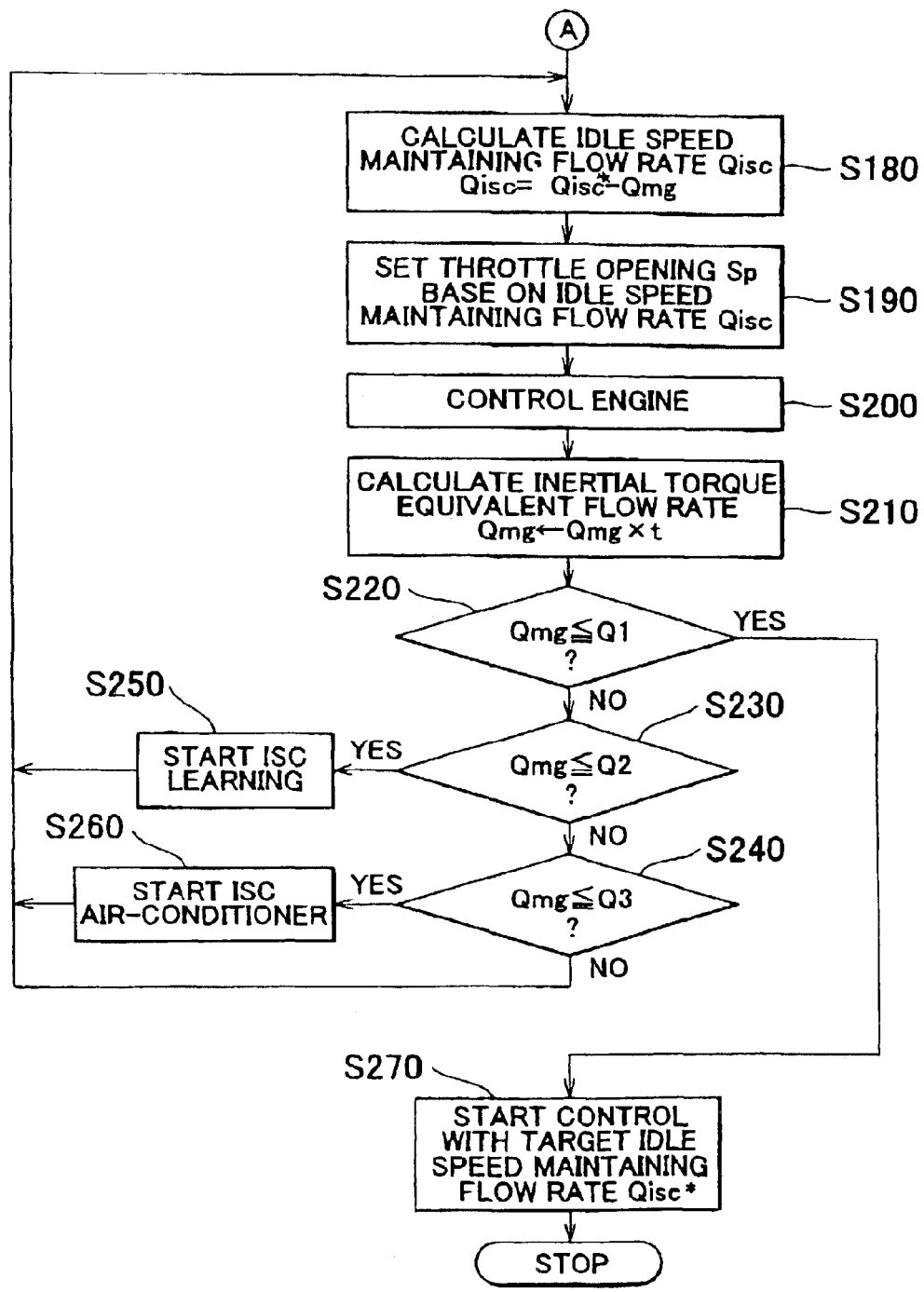

FIG. 3 is a flowchart showing one example of an engine start routine executed by the electronic control unit 50 when the predetermined starting condition has been fulfilled during the idle stop control. When the routine is executed, the electronic control unit 50 first stops an air conditioner for a passenger compartment, not shown, and prohibits learning of control amounts related to the idling operation of the engine 22 (i.e., idle speed maintaining flow rate, air-fuel ratio for maintaining the idle speed), and subsequently starts the motor generator 36 (step S100). During the idle stop control, the clutch 42 is ON so that the engine 22 is driven and thus cranked by the motor generator 36. When the shift position SP is in D range (i.e., drive range), the motor generator 36 outputs torque to the crankshaft 26. The rotation speed of the crankshaft 26 thus driven by the motor generator 36 is then changed at the automatic transmission 28, and is transmitted to the wheels 34*a*, 34*b*. Namely, the hybrid vehicle 20 is able to run using the running torque generated by the motor generator 36. When the shift position SP is in N range (i.e., neutral range), a clutch (not shown) provided in the automatic transmission 28 is OFF, and therefore, the torque generated by the motor generator 36 is not output to the driven wheels 34*a*, 34*b*.

When the motor generator 36 starts, the electronic control unit 50 reads the engine speed Ne, the coolant temperature Tw, and the shift position SP, which are all transmitted from the engine ECU 24, and waits until the engine speed Ne reaches an idle speed (steps S110, S120). The engine speed Ne may be determined based on the crank position detected by the crank position sensor 162 or may be directly detected using an engine speed sensor, not shown.

Figure 4:
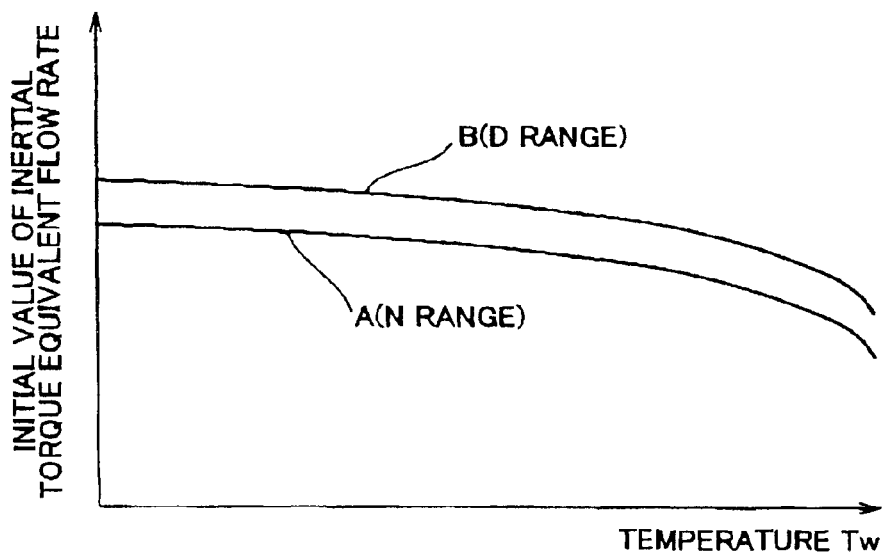
FIG. 4 is a graph showing one example of a map for setting an initial value of an inertia torque equivalent flow rate Qmg.
Figure 5:
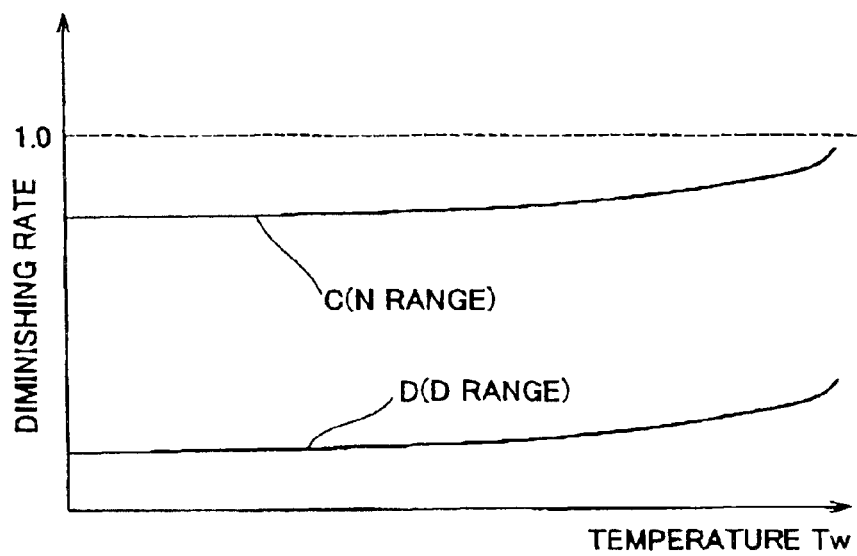
FIG. 5 is a graph showing one example of a map for setting a diminishing rate.

When the engine speed Ne reaches the idle speed, the electronic control unit 50 sets an initial value of an inertia torque equivalent flow rate Qmg and a diminishing rate t based on whether the shift position SP is in N or D range (steps S130 to S150). The inertia torque equivalent flow rate Qmg is an air flow rate equivalent to the magnitude of inertial torque that acts on rotational elements related to the crankshaft 26, such as the motor generator 36 and the engine 22, right after the cranking of the engine 22 by the motor generator 36 has been stopped. The inertia torque equivalent flow rate Qmg is set based on, for example, the coolant temperature Tw and the shift position SP. In the embodiment, the initial value of the inertia torque equivalent flow rate Qmg is set in the following manner. That is, the relationship between the coolant temperature Tw and the initial value of the inertia torque equivalent flow rate Qmg is obtained in advance for each shift position according tests results or the like, and the relationship is pre-stored in the ROM in the form of a map. Using the map, the initial value of the inertia torque equivalent flow rate Qmg is set according to the shift position SP and the coolant temperature Tw. FIG. 4 is a graph showing one example of this map. In the graph, curve A represents the relationship established between the coolant temperature Tw and the inertia torque equivalent flow rate Qmg when the shift position is in N range, whereas curve B represents the same relationship established when the shift position SP is in D range. As is apparent from the graph, the initial value of the inertia torque equivalent flow rate Qmg is differently set for each shift position (D or N range). This difference corresponds to whether influences by loads located after the automatic transmission 28 are present, i.e., whether a clutch disposed in the automatic transmission 28, not shown in the drawing, is ON or OFF. Meanwhile, the diminishing rate t is used for setting changes with time in the inertia torque equivalent flow rate Qmg after the motor generator 36 has been stopped. The diminishing rate t, as well as the initial value of the inertia torque equivalent flow rate Qmg, is set based on the coolant temperature Tw and the shift position SP. In the embodiment, the diminishing rate t is set in the following manner. That is, the relationship between the coolant temperature Tw and the diminishing rate t is obtained in advance for each shift position by tests or the like, and the relationship thus determined is pre-stored in the ROM in the form of a map. Using the map, the diminishing rate t is set according to the shift position SP and the coolant temperature Tw. FIG. 5 is a graph showing one example of this map. In the graph, curve C represents the relationship established between the coolant temperature Tw and the diminishing rate t when the shift position SP is in N range, whereas curve D represents the same relationship established when the shift position SP in D range. As is understood from the graph, there is a large difference between the diminishing rate t set when the shift position SP is in N range and that set when the shift position SP is in D range. This difference corresponds to whether influences by loads located after the automatic transmission are present, i.e., whether the clutch disposed in the automatic transmission 28, not shown in the drawing, is ON or OFF. In actual operation, the diminishing rate t is set based on the frequency of repeating steps S180 to S260.

Having set the initial value of the inertia torque equivalent flow rate Qmg and the diminishing rate t in the above-mentioned manner, the electronic control unit 50 then stops the motor generator 36 that is driving the engine 22 at the idle speed (step S160), and starts the feedback control of the idle speed (step S170). In this feedback control, for example, the intake amount is adjusted according to deviations between the engine speed Ne and the target idle speed. Although the feedback control is not effective at the beginning where the engine 22 is being driven by the motor generator 36 at the idle speed, it becomes effective when the idle speed maintaining flow rate Qisc begins to be used for controlling the engine 22, as will be described later.

When the feedback control of the idle speed starts, the electronic control unit 50 first sets the idle speed maintaining flow rate Qisc at a value obtained by subtracting the inertia torque equivalent flow rate Qmg from a predetermined target idle speed maintaining flow rate Qisc* (step S180). The electronic control unit 50 then sets an opening (hereinafter, will be referred to as a "throttle opening") Sq of the throttle valve 124 based on the idle speed maintaining flow rate Qisc, and controls the engine 22 using the throttle opening Sq (step S200). Subsequently, the electronic control unit 50 calculates a new inertia torque equivalent flow rate Qmg by multiplying the inertia torque equivalent flow rate Qmg with the diminishing rate t (step S210), and compares the new inertia torque equivalent flow rate Qmg with threshold values Q1, Q2, and Q3 (steps S220 to S240). Thus, steps S180 to S260 are repeated until the inertia torque equivalent flow rate Qmg becomes equal to or smaller than the threshold value Q1. The threshold value Q1 is a reference value for determining whether to finish the engine start control of the engine 22, the threshold value Q2 is a reference value for determining whether to cancel the prohibition of learning of the control amounts, and the threshold value Q3 is a reference value for determining whether to restart the air conditioner. In the embodiment, these threshold values have a relationship of Q1<Q2<Q3. More specifically, when the inertia torque equivalent flow rate Qmg becomes equal to or smaller than the threshold value Q3 while repeating steps S180 to S260, the electronic control unit 50 resumes the operation of the air conditioner (step S260). When the inertia torque equivalent flow rate Qmg becomes equal to or smaller than the threshold value Q2, the electronic control unit 50 cancels the prohibition of learning of the control amounts (step S250). When the inertia torque equivalent flow rate Qmg becomes equal to or smaller than Q1, the electronic control unit 50 starts the idle speed control at the target idle speed maintaining flow rate Qisc*, not using the inertia torque equivalent flow rate Qmg (step S270), after which the routine ends.

Figure 6:
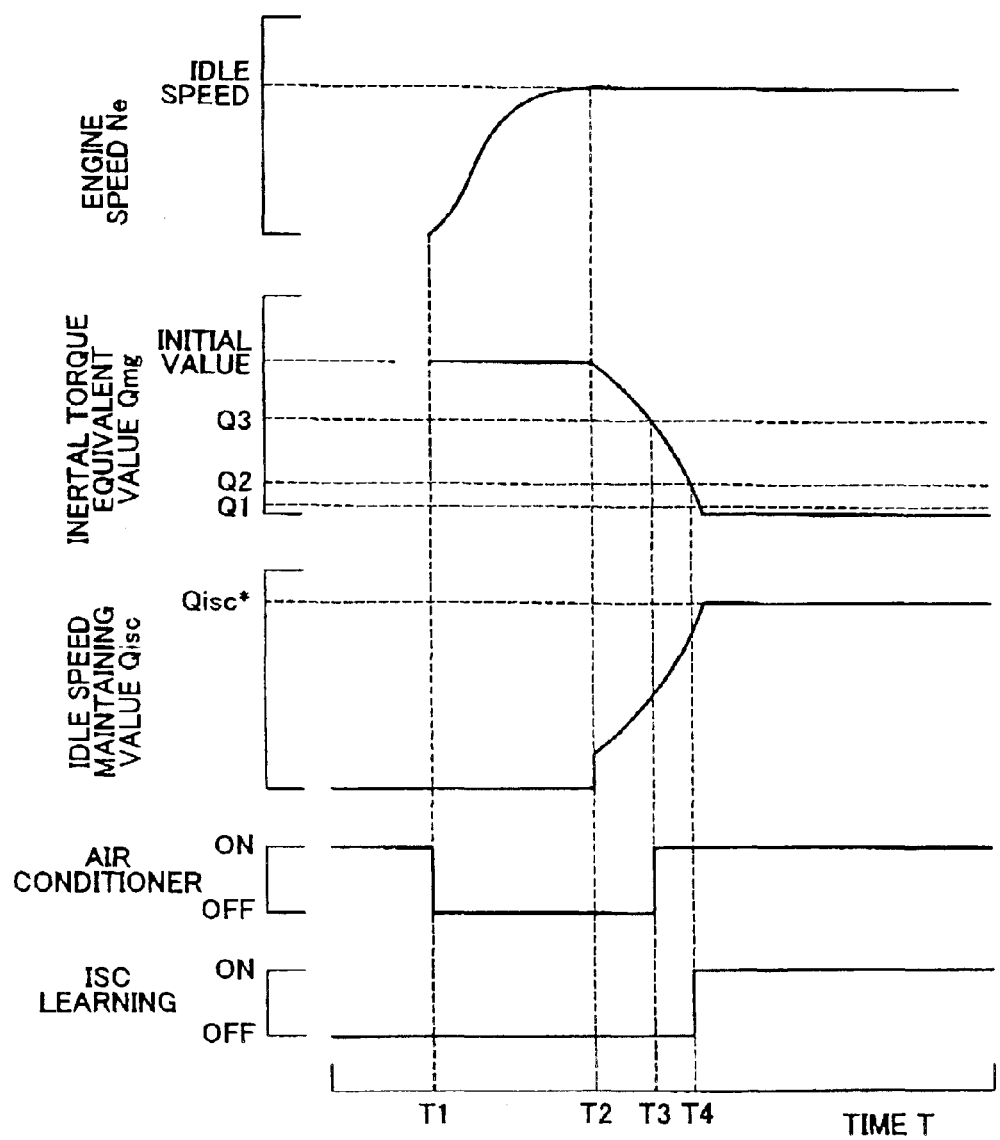
FIG. 6 is a timechart illustrating exemplary changes with time in the engine speed, the inertia torque equivalent flow rate Qmg, the idle speed maintaining flow rate Qisc, the operation state of the air conditioner, and the state of learning of control amounts related to the idling operation of the engine, which are observed when the engine is started with the shift position set in D range.
Figure 7:
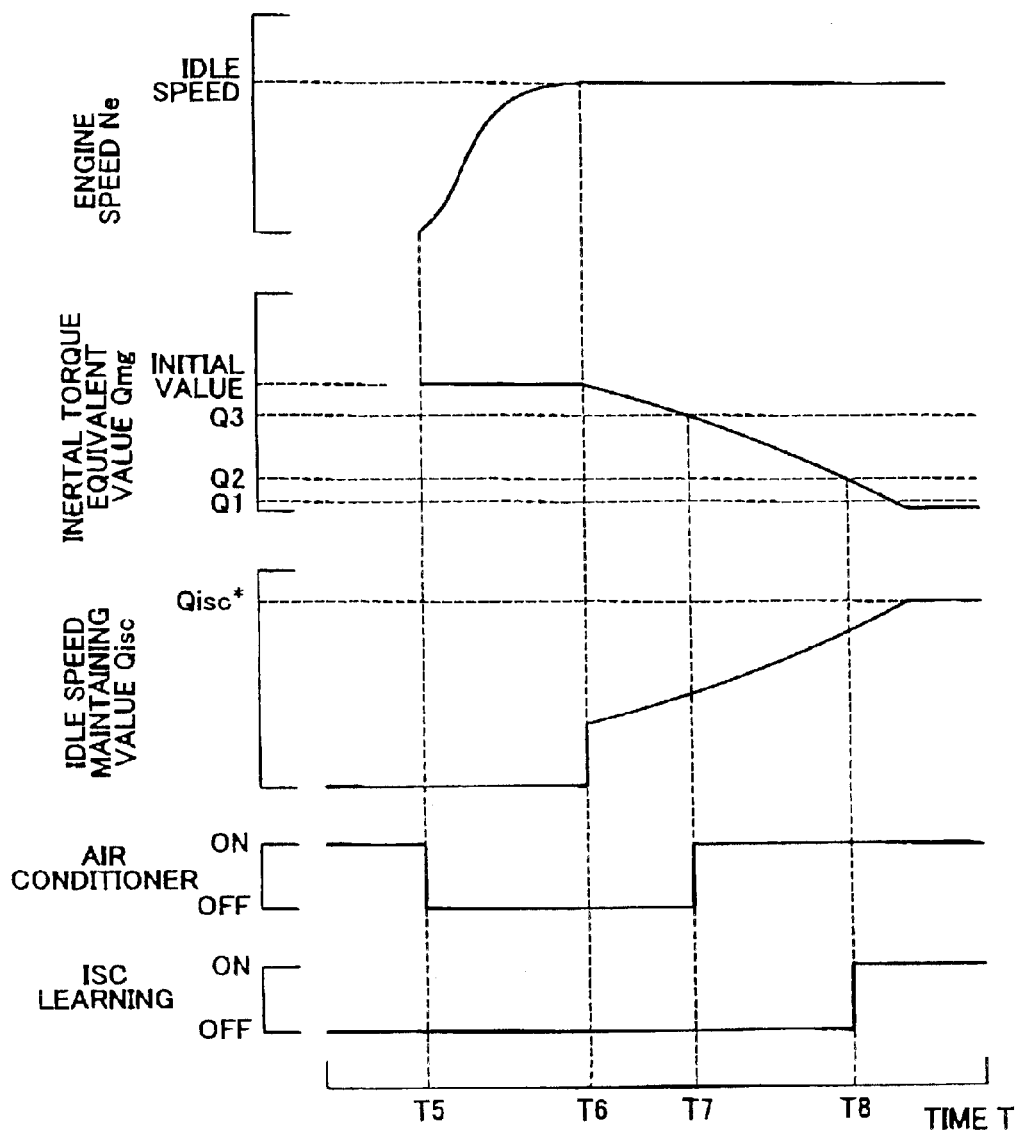
FIG. 7 is a timechart illustrating exemplary changes with time in the engine speed, the inertia torque equivalent flow rate Qmg, the idle speed maintaining flow rate Qisc, the operation state of the air conditioner, and the state of learning of control amounts related to the idling operation of the engine, which are observed when the engine is started with the shift position set in N range.

FIG. 6 is a timechart illustrating exemplary changes with time in the engine speed Ne, the inertia torque equivalent flow rate Qmg, the idle speed maintaining flow rate Qisc, the operation state of the air conditioner, and the state of learning of the control amounts related to the idling operation of the engine 22, which are observed when the engine 22 is started according to the aforementioned routine with the shift position set in D range. Likewise, FIG. 7 is a timechart illustrating the same exemplary changes, which are observed when the engine 22 is started according to the aforementioned routine with the shift position set in N range. As shown in FIGS. 6 and 7, regardless of whether the shift position SP is in D or N range, when a predetermined starting condition is fulfilled at time T1 (or T5), the electronic control unit 50 stops the air conditioner, and starts driving of the engine 22 by the motor generator 36. When the engine speed Ne reaches the idle speed at time T2 (or T6), the electronic control unit 50 stops the motor generator 36, and begins to control the engine 22 using the idle speed maintaining flow rate Qisc, and calculates the idle speed maintaining flow rate Qisc using the initial value of the inertia torque equivalent flow rate Qmg which is set based on the shift position SP and the coolant temperature Tw, as aforementioned. When the shift position SP is in D range, the initial value of the inertia torque equivalent flow rate Qmg is set somewhat larger compared to when the shift position SP is in N range. Also, the diminishing rate t is set relatively small when the shift position SP is in D range, and is set relatively large when the shift position SP is in N range. Thus, the inertia torque equivalent flow rate Qmg rapidly decreases when the shift position SP is in D range, and slowly decreases when the shift position SP is in N range. The operation of the air conditioner resumes when the inertia torque equivalent flow rate Qmg reaches the threshold value Q3 at time T3 (or T7). Next, learning of control amounts related to the idling operation of the engine 22 starts when the inertia torque equivalent flow rate Qmg reaches the threshold value Q2 at time T3 (or T8). Lastly, the routine ends when the inertia torque equivalent flow rate Qmg reaches the threshold value Q1.

According to the embodiment described above, upon starting the engine 22, the engine 22 is driven by the motor generator 36 until its speed reaches the idle speed. When the motor generator 35 is stopped, the speed of the engine 22 is controlled at the idle speed using the idle speed maintaining flow rate Qisc calculated factoring in the inertia torque equivalent flow rate Qmg, which is equivalent to the magnitude of inertia toque that acts on rotational elements related to the crankshaft 26 after the stop of the cranking by the motor generator 36. Accordingly, it is possible to effectively avoid or suppress racing of the engine 22, and torque shocks at the crankshaft 26, and the like, which may be caused by the inertia torque aforementioned, as compared to when the target idle speed maintaining flow rate Qisc* is calculated without factoring in the inertia torque equivalent flow rate Qmg. Namely, the engine 22 can be started while maintaining the engine speed at the idle speed, without suffering from torque shocks. Furthermore, since the idle speed maintaining flow rate Qisc is calculated using the initial value of the inertia torque equivalent flow rate Qmg and the diminishing rate t, both set based on the shift position SP and the coolant temperature Tw, it is possible to stably reduce torque shocks and start the engine while maintaining the engine speed at the idle speed, regardless of the shift position SP and the coolant temperature Tw. Also, during an engine start, the air conditioner is stopped until the inertia torque equivalent flow rate Qmg becomes equal to or lower than the threshold value Q3. Therefore, the engine speed control can proceed without being affected by external disturbances. Likewise, during an engine start, learning of control amounts related to the idle speed control is prohibited until the inertia torque equivalent flow rate Qmg becomes equal to or lower than the threshold value Q2, which prevents errors in the learning, which may otherwise occur.

According to the embodiment described above, the initial value of the inertia torque equivalent flow rate Qmg and the diminishing rate t are set based on the shift position SP and the coolant temperature Tw, and the engine 22 is controlled using the idle speed maintaining flow rate Qisc which is set factoring in the inertia torque equivalent flow rate Qmg, until the inertia torque equivalent flow rate Qmg becomes almost zero. In other words, the engine 22 is controlled using the idle speed maintaining flow rate Qisc which is set factoring in the inertia torque equivalent flow rate Qmg, after the stop of cranking by the motor generator 36 until a predetermined time determined based on the shift position SP and the temperature Tw passes. After the predetermined time passes, the engine 22 is then controlled using the idle speed maintaining flow rate Qisc which is set without factoring in the inertia torque equivalent flow rate Qmg, that is, the target idle speed maintaining flow rate Qisc*. Namely, the engine 22 is controlled using the idle speed maintaining flow rate Qisc, which is a different control amount from that used for driving the engine 22 at the idle speed after engine start, during a period after the stop of the cranking by the motor generator 36 until the predetermined time passes. After the predetermined time passes, the engine 22 is then controlled using the target idle speed maintaining flow rate Qisc*, namely, a control amount equal to that used for driving the engine 22 at the idle speed after an engine start.

While the initial value of the inertia torque equivalent flow rate Qmg varies depending upon whether the shift position SP is in D or N range in the embodiment described above, the initial value may be set at the same value independent of the shift position SP, even though a slight torque shock may occur or the stability of the engine start may become somewhat lower. Besides, while the initial value of the inertia torque equivalent flow rate Qmg varies depending upon the coolant temperature Tw, the initial value may be set independent of the coolant temperature Tw.

Also, while the diminishing rate t of the inertia torque equivalent flow rate Qmg varies depending upon whether the shift position SP is in D or N range, the diminishing rate t may be set at the same value independent of the shift position SP, even though a slight torque shock may occur or the stability of the start may become somewhat lower. Also, while the diminishing rate t of the inertia torque equivalent flow rate Qmg varies depending upon the coolant temperature Tw, the diminishing rate t may be set independent of the coolant temperature Tw.

Also, while the operation of the air conditioner is suspended until the inertia torque equivalent flow rate Qmg becomes equal to or lower than the threshold value Q3 for the purpose of eliminating or reducing external disturbances to the engine speed control, the suspension of the air conditioner is not necessarily carried out, though the stability of the engine speed control may be somewhat reduced.

While the aforementioned processes and controls are performed in an automatic engine start operation of the idle stop control, the idle speed maintaining flow rate Qisc set factoring in the inertial torque equivalent flow rate Qmg may also be effectively utilized at the time of stopping the power generation of the motor generator 36 using the driving power of the engine 22. That is, the idle speed maintaining flow rate Qisc can be effectively used in controlling the engine 22 right after stopping the motor generator 36 connected to the crankshaft 26 via the clutch 42 and operating under a power running control or power regeneration control. Thus, torque shocks, which may otherwise occur at the crankshaft 26 right after the stop of the motor generator 36, can be reduced. By the way, for enabling such a control, the initial value of the inertia torque equivalent flow rate Qmg and the diminishing rate t are optimized according test results, or the like, using the shift position SP and the coolant temperature Tw as variables.

While the inertia of the rotational elements related to the crankshaft 26 is converted into the "inertia torque equivalent flow rate" corresponding to the idle speed maintaining flow rate Qisc in the embodiment, it may be estimated as other various control values such as ignition timing, opening/closing timing of intake and exhaust valves.

Figure 8:
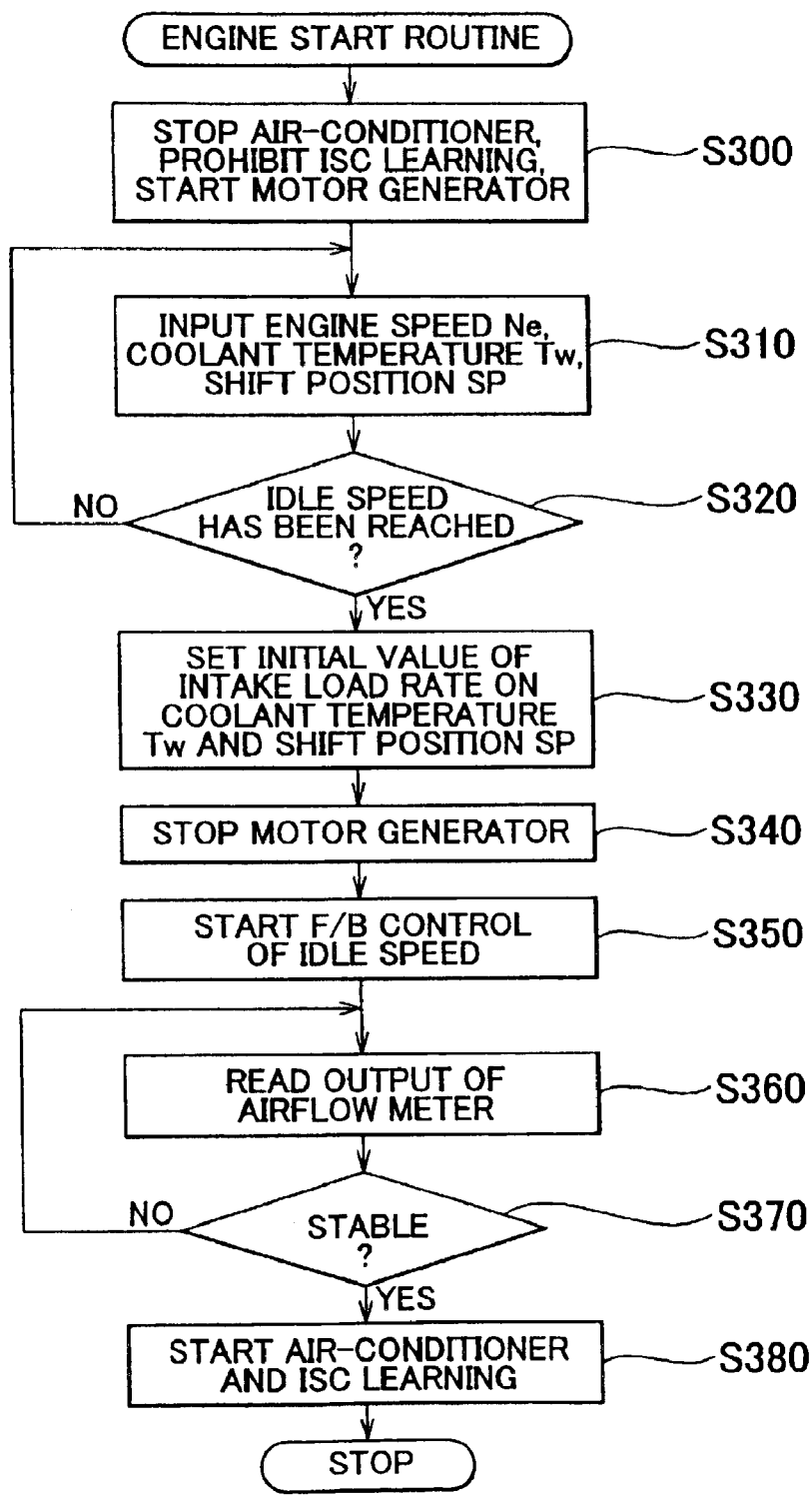
FIG. 8 is a flowchart showing one example of a routine for starting the engine.

In the embodiment, after the engine 22 has been cranked by the motor generator 36 and its speed has increased up to the idle speed, the start operation of the engine 22 is controlled using the idle speed maintaining flow rate Qisc calculated factoring in the inertial torque equivalent flow rate Qmg, that is, an air flow rate equivalent to the inertia torque which occurs in the engine 22, and the like, during the cranking by the motor generator 36. Optionally, the start operation of the engine 22 may be controlled by setting an initial value of intake load rate based on the shift position SP and the coolant temperature Tw. This can be implemented by, for example, executing the routine shown in FIG. 8. In this routine, to begin with, the operation of the air conditioner is stopped, the learning of control amounts related to the idling operation of the engine 22 is prohibited, and driving of the engine 22 by the motor generator 36 is started (step S300). When the engine speed Ne reaches the idle speed (step S320: YES), the initial value of intake load rate is calculated based on the shift position SP and the coolant temperature Tw (step S330). At this time, the initial value of the intake load rate is set smaller as compared to when the engine 22 is cranked and thus started by the starter motor 23 after the ignition switch is turned on. This is because the initial value of the intake load rate is set larger than necessary when it is started by the starter motor 23, thus giving the highest priority to ensuring a sufficient reliability in starting the engine 22. In this control, however, the initial value of the intake load rate is set such that it has the same characteristic as the initial value of the inertial torque equivalent flow rate Qmg, namely such that it becomes larger when the shift position is in D range as compared to when the shift position is in N range, and such that it decreases as the coolant temperature Tw increases irrespective of whether the shift position is D or N range. Then, the motor generator 36 is stopped (step S340), and the fuel injection control, ignition control, and feedback control of the idle speed are started (step S350). When the detection value of the airflow meter becomes stable, the operation of the air conditioner resumes, and the learning of control amounts related to the idling operation of the engine 22 starts (steps S360, S370), after which the routine ends.

Figure 9:
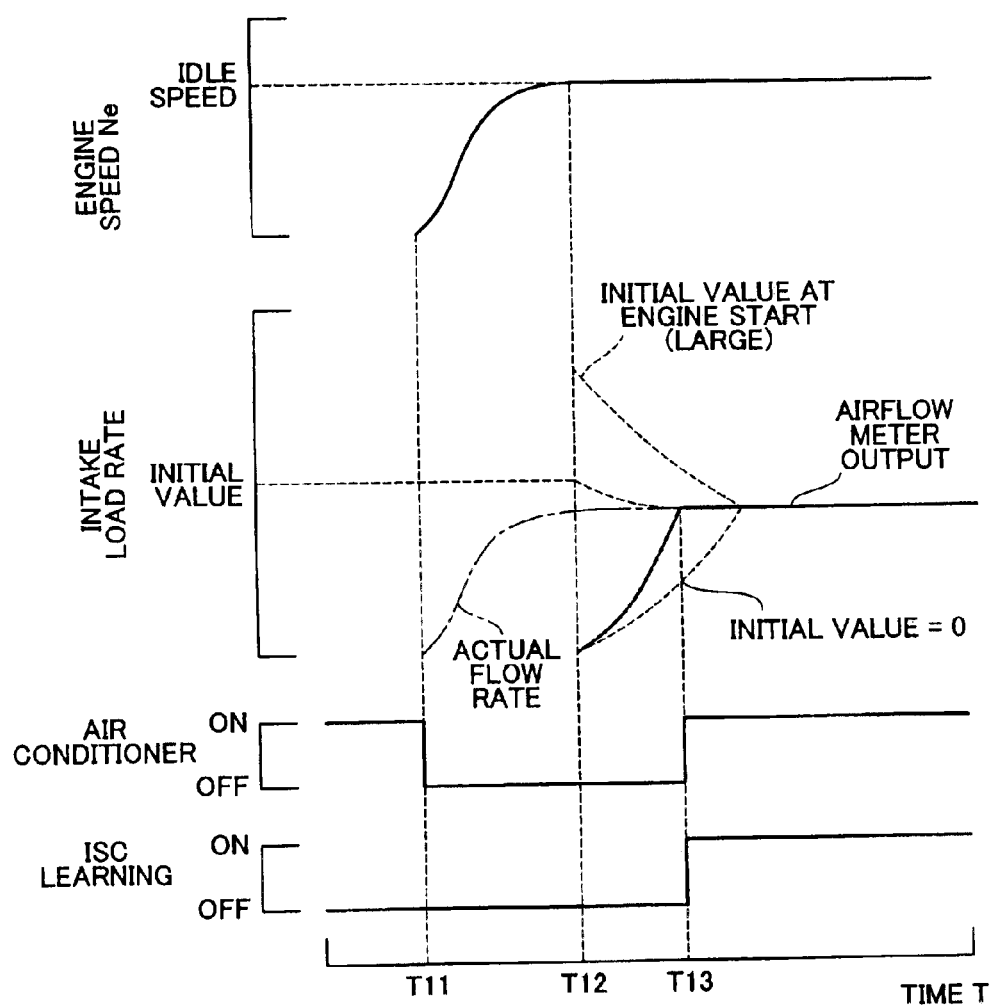
FIG. 9 is a timechart illustrating exemplary changes with time in the engine speed Ne, the intake load rate, the operation of the air conditioner and the learning of the control amounts related to the idling operation of the engine, that are observed when the engine is started according to the routine shown in FIG. 8.

FIG. 9 is a timechart illustrating exemplary changes with time in the engine speed Ne, the intake load rate, the operation of the air conditioner and the learning of the control amounts related to the idling operation of the engine 22, which are observed when the engine 22 is started according to the routine described above. When a predetermined starting condition is fulfilled at time T11, the electronic control unit 50 stops the air conditioner and starts cranking of the engine 22 by the motor generator 36. When the engine speed Ne reaches the idle speed at time T12, the electronic control unit 50 then stops the motor generator 36, and starts a control of the engine 22 using the initial value of the intake load rate that is set based on the shift position SP and the coolant temperature Tw. At this time, also, the airflow meter starts outputting detection values. The output of the airflow meter, however, shows some delays at the beginning, and becomes stable at time T13. The timechart in FIG. 9 also shows a state of the intake load rate where the initial value is set at an unnecessarily large value, a state of the same where the initial value is set at zero, and a state of the actual intake flow rate during an engine start in the embodiment. As shown in FIG. 9, a better convergence of the intake air amount can be achieved regardless of the delays in the output from the air flow meter, as compared to when the initial value is set at the unnecessarily large value or zero during an engine start. Thus, it is possible to reduce fluctuations in torque which may be caused by deviation of the air-fuel ratio.

As described above, with the control system of the embodiment, the engine 22 is controlled to start and run at the idle speed, based on the idle speed maintaining flow rate Qisc that is calculated factoring in the inertia torque equivalent flow rate which is equivalent to the inertia torque that acts on rotational elements related to the crankshaft 26 after the stop of the cranking by the motor generator 36. Also, the control for starting the engine 22 uses the initial value of the intake load rate is set based on the shift position SP and the coolant temperature Tw, which is namely a different control amount from that used in the case where the engine 22 is started by the starter motor when the ignition switch is turned on. Thus, it is possible to reduce torque shocks during an engine start and improve the reliability in starting the engine 22.

While the engine 22 directly injects fuel into the combustion chambers in the above-described embodiment, it may be of a type which injects fuel to an intake manifold. That is, the control system according to the embodiment may be applied to various types of engines other than gasoline engines, such as diesel engines.

According to the embodiment, also, the engine 22 is cranked by the motor generator 36 until the engine speed reaches the idle speed during an automatic engine start. At this time, optionally, the engine 22 may be driven (cranked) up to a speed that is higher than or somewhat lower than the idle speed.

While the motor generator 36 is connected to the crankshaft 26 of the engine 22 through the belt 48 in the embodiment, any other configurations or constructions may be adopted as long as the engine 22 can be automatically stopped and started. For example, the hybrid vehicle 20 may be configured as a so-called parallel hybrid vehicle in which driving power generated by the engine is partially transmitted to the vehicle axle and the rest of the driving power is converted into electric power for recharging a secondary battery, and the electric power thus stored in the battery is supplied to a motor mounted on the side of the vehicle axle. The hybrid vehicle 20 may also be configured as a so-called series hybrid vehicle in which driving power generated by the engine 22 is entirely converted into an electric power for recharging a secondary battery, and the electric power thus stored in the battery is used for driving the vehicle. Furthermore, the hybrid vehicle 20 may have a configuration or construction other than that of hybrid vehicles. Also, the automatic transmission 28 may be of any type, or may be omitted where appropriate.

Although the control system according to the invention is applied to the hybrid vehicle 20 that is able to run using the motor generator 36 in the embodiment described above, this puts no limits in the application of the control system according to the invention. Namely, it is possible to apply the control system of the invention to a motor vehicle of any other type if it has an engine.

While the invention has been described in detail with reference to the exemplary embodiment, it will be apparent that the invention is not limited to the above-mentioned embodiment, and that the invention may be realized in various other embodiments within the scope of the invention.

What is claimed is:

1. A control system for a motor vehicle including an internal combustion engine and a motor connected to an output shaft of the internal combustion engine, comprising:
   a controller that performs a start control for starting the internal combustion engine, wherein
   the controller is adapted to, when the internal combustion engine is cranked by the motor and the speed of the internal combustion engine reaches a predetermined speed, stop the cranking by the motor and estimate an inertia value indicative of inertia that acts on a rotational element related to the output shaft after the stop of the cranking by the motor, and control the internal combustion engine based on the estimated inertia value such that the internal combustion engine runs at an idle speed.

2. The control system according to claim 1, wherein the inertia value is an inertia torque value indicative of inertia torque that acts on the rotational element, the inertia torque value corresponding to an idle control amount used for controlling the internal combustion engine to run at the idle speed.

3. The control system according to claim 2, wherein the controller is adapted to control the internal combustion engine using a control amount obtained by subtracting the inertia torque value from a target idle control amount after the stop of the cranking by the motor.

4. The control system according to claim 1, wherein the controller is adapted to estimate the inertia value based on temperature of the internal combustion engine.

5. The control system according to claim 4, wherein the controller is adapted to estimate the inertia value such that the inertia value becomes smaller as the temperature of the internal combustion engine becomes higher.

6. The control system according to claim 1, wherein
   the motor vehicle is provided with an automatic transmission to be shifted between at least a neutral position and a drive position, which transmits power output from the output shaft to the side of a vehicle axle while automatically changing the speed of rotation, and
   the controller is adapted to estimate the inertia value based on a shift position of the automatic transmission.

7. The control system according to claim 1, wherein the motor vehicle is provided with an automatic transmission to be shifted between at least a neutral position and a drive position, which transmits power output from the output shaft to the side of a vehicle axle while automatically changing the speed of rotation, and
   the controller is adapted to estimate the inertia value based on an initial value of the inertia value corresponding to the shift position and a diminishing rate corresponding to the shift position.

8. The control system according to claim 7, wherein
   the initial value, when the shift position is the neutral position, becomes smaller than when the shift position is the drive position, and
   the diminishing rate, when the shift position is the neutral position, becomes larger than when the shift position is the drive position.

9. The control system according to claim 1, wherein the controller is adapted to prohibit learning of control amounts related to an idling operation of the internal combustion engine when the inertia value is estimated to be equal to or larger than a first reference value.

10. The control system according to claim 1, wherein the controller is adapted to stop driving of a given auxiliary when the inertia value is estimated to be equal to or larger than a second reference value.

11. The control system according to claim 1, wherein the controller is adapted to perform a feedback control such that the internal combustion engine runs at the idle speed.

12. The control system according to claim 1, wherein the predetermined speed is equal to one of the idle speed and an approximate value of the idle speed.

13. The control system according to claim 1, wherein the controller is adapted to perform the start control when a predetermined starting condition is fulfilled after a predetermined stopping condition has been fulfilled and the internal combustion engine has been automatically stopped.

14. A control system for a motor vehicle including an internal combustion engine and a motor connected to an output shaft of the internal combustion engine, comprising:
a controller for performing an automatic start/stop control of the internal combustion engine, wherein
the controller is adapted to, during an automatic start of the internal combustion engine, control the internal combustion engine such that the internal combustion engine runs at an idle speed, using a different control amount from that used when a start of the internal combustion engine is triggered by an operation of an operator.

15. A control system for a motor vehicle including an internal combustion engine and a motor connected to an output shaft of the internal combustion engine, comprising:
a controller for performing an automatic start/stop control of the internal combustion engine, wherein
the controller is adapted to control the internal combustion engine such that the internal combustion engine runs at an idle speed, using a first control amount until a predetermined time passes after the internal combustion engine has been started, and control the internal combustion engine such that the internal combustion engine runs at the idle speed, using a second control amount that is different from the first control amount, after the predetermined time has passed.

16. The control system according to claim 15, wherein the first control amount is smaller than the second control amount.

17. The control system according to claim 16, wherein the first control amount is a value obtained by subtracting a value equivalent to inertia that acts on a rotational element related to the output shaft from the second control amount.

18. A control system for a motor vehicle including an internal combustion engine and a motor connected to an output shaft of the internal combustion engine, comprising:
a controller that performs a transition control for controlling a transition from a state where power is output to the output shaft from the motor to a state where the internal combustion engine idles with the motor outputting no power to the output shaft, wherein
the controller is adapted to, when the speed of the internal combustion engine reaches a predetermined speed, stop the motor and estimate an inertia value indicative of inertia which acts on a rotational element related to the output shaft after the stop of the motor, and control the internal combustion engine based on the estimated inertia value such that the internal combustion engine runs at an idle speed.

19. The control system according to claim 18, wherein the controller is adapted to perform the transition control at the time of starting the internal combustion engine.

20. The control system according to claim 18, wherein
the motor is capable of generating electric power, and
the controller is adapted to perform the transition control at the time of stopping the motor when the motor is generating electric power using driving power from the output shaft.

21. The control system according to claim 1, wherein the motor vehicle comprises a hybrid vehicle which is able to run using driving power output from the motor to the output shaft.

22. A method for controlling a start of an internal combustion engine of a motor vehicle including a motor connected to the output of the internal combustion engine, wherein
the internal combustion engine is cranked by the motor,
the cranking by the motor is stopped when a speed of the internal combustion engine reaches a predetermined speed,
an inertia value indicative of inertia that acts on a rotational element related to the output shaft after the stop of the cranking by the motor is estimated, and
the internal combustion engine is controlled based on the estimated inertia value so as to run at an idle speed.

23. A method for controlling an automatic start of an internal combustion engine of a motor vehicle including a motor connected to the output of the internal combustion engine, wherein
the internal combustion engine, during an automatic start of the internal combustion engine, is controlled so as to run at an idle speed, using a different control amount from that used when a start of the internal combustion engine is triggered by an operation of an operator.

24. A method for controlling an automatic start of an internal combustion engine of a motor vehicle including a motor connected to the output of the internal combustion engine, wherein
the internal combustion engine is controlled so as to run at an idle speed using a first control amount until a predetermined time passes after the internal combustion engine has been started,
the internal combustion engine is controlled so as to run at the idle speed using a second control amount that is different from the first control amount, after the predetermined time has passed.

25. A method for controlling a transition of a start operation state of an internal combustion engine of a motor vehicle including a motor connected to an output shaft of the internal combustion engine from a state where power is output to the output shaft from the motor to a state where the internal combustion engine idles with the motor outputting no power to the output shaft, wherein
when the speed of the internal combustion engine reaches a predetermined speed, the motor is stopped and an inertia value indicative of inertia that acts on a rotational element related to the output shaft after the stop of the motor is estimated, and
the internal combustion engine is controlled based on the estimated inertia value so as to run at an idle speed.

* * * * *